A. D. Puffer,
Hose,
Nº 14,929.                    Patented May 20, 1856.
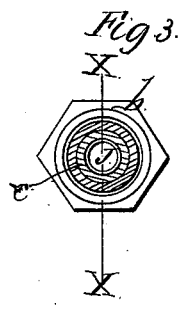
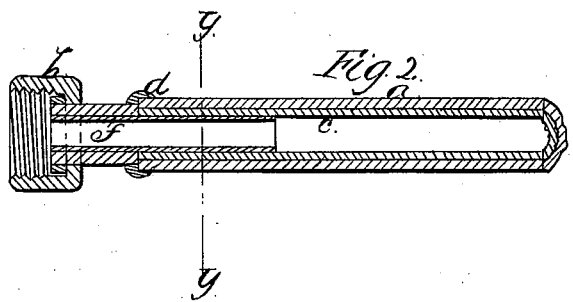
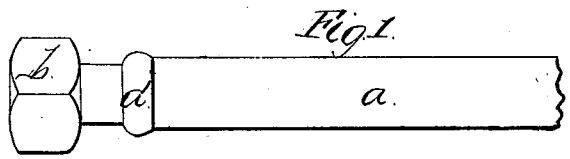

UNITED STATES PATENT OFFICE.

A. D. PUFFER, OF SOMERVILLE, MASSACHUSETTS.

LINING METAL PIPES WITH GUTTA-PERCHA.

Specification of Letters Patent No. 14,929, dated May 20, 1856.

*To all whom it may concern:*

Be it known that I, A. D. PUFFER, of Somerville, in the county of Middlesex and State of Massachusetts, have invented a new and Improved Method of Lining Lead and other Metallic Pipe with Gutta-Percha, of which the following is a full, clear, and exact description, reference being had to the annexed drawing, making part of this specification, in which—

Figure 1, is a view of a piece of my pipe with a coupling attached; Fig. 2, a longitudinal section, upon the line X X of Fig. 3, through the same, showing the manner in which the coupling is attached to the pipe without displacing the gutta percha lining; Fig. 3 a transverse section upon the line Y Y of Fig. 2.

When soda or mineral water is drawn from the fountain or receiver, it first passes into a cooler which is surrounded by ice, and from this cooler it passes through several feet of lead pipe to the cock. While standing in this pipe and before it reaches the cock, the soda is liable to be again warmed and my invention has for one of its objects the removal of this difficulty and to produce a pipe that shall not be liable to the above objection; and my invention consists in a peculiar method of lining metallic pipe with gutta percha, the nonconducting nature of gutta percha preserving the liquid for a great length of time, of the same or nearly the same temperature which it has when it leaves the cooler.

To enable others skilled in the art to understand my invention I will proceed to describe the manner in which I have carried it out. Lead pipe of a diameter somewhat larger than is ultimately required is employed; into this pipe is inserted a tube of gutta percha of a size just sufficient to fill it. The leaden pipe is then drawn down until the gutta percha is firmly compressed and inclosed. To facilitate the operation the lead may be sufficiently warmed by means of hot water to enable it slightly to soften the gutta percha, whereby a tight joint between the two is secured. This may be further insured by giving to the exterior of the gutta percha tube a coating of india rubber or other suitable cement. I have not however found this necessary, the compression of the lead upon the warm gutta percha being sufficient to unite the two very firmly. It is evident that a tube thus constructed, will not only be an exceedingly bad conductor of heat, but that it will be effectually coated and preserved from the action of acids or other corrosive agents.

In the accompanying drawings is represented a specimen of pipe lined with gutta percha as above described, in which is also shown the method employed to unite the pipe with the ordinary coupling.

*a*, is the leaden pipe; *c*, the gutta percha lining; *b*, the ordinary coupling which is secured to the leaden pipe by the ring of solder *d*. To prevent the gutta percha from falling and filling the tube, when softened by the action of soldering, a short metallic tube *f* is driven through the coupling into the tube, slightly compressing the gutta percha; the solder is then applied and if the lining be softened by the operation it is sustained in place by the tube *f*, until it again cools.

It is evident that the above may be employed with advantage, as a means of protecting pipes for conducting cold water, as it will effectually protect them from corrosion and preserve the purity of the water.

What I claim as my invention and desire to secure by Letters Patent is—

The method herein described of lining metallic pipes with gutta percha, the pipe being drawn down upon the lining in the manner set forth.

A. D. PUFFER.

Witnesses:
  SAM. COOPER,
  THOS. R. ROACH.